J. L. HECHT.
METAL WHEEL CONSTRUCTION.
APPLICATION FILED OCT. 29, 1914.

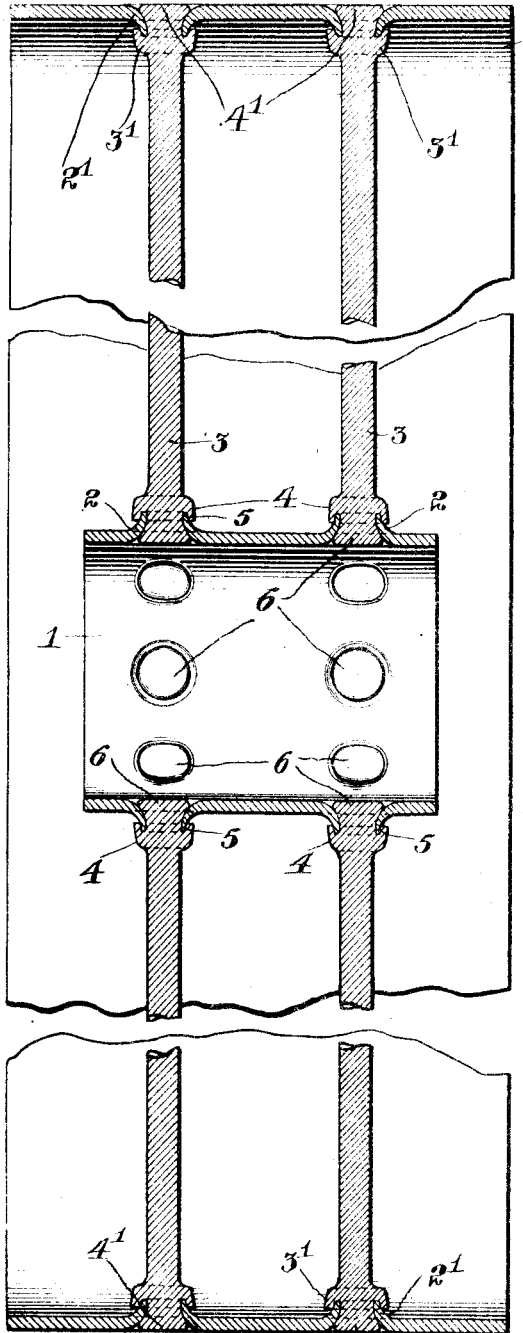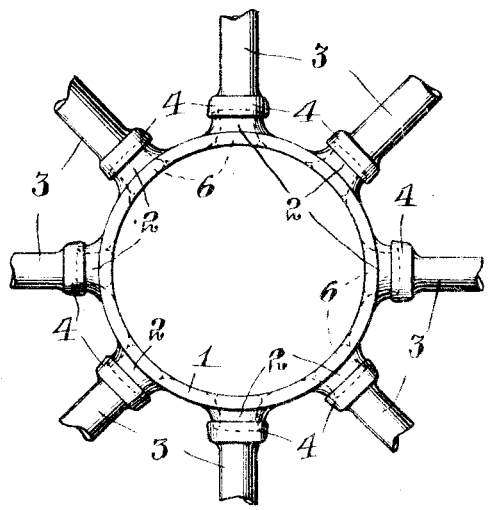

1,199,179.

Patented Sept. 26, 1916.
2 SHEETS—SHEET 2.

Attest:
Mitchey
G. F. Hotchkiss

Inventor:
J. L. Hecht
by Rogers, Kennedy Campbell Attys

UNITED STATES PATENT OFFICE.

JOSEPH L. HECHT, OF DAVENPORT, IOWA, ASSIGNOR TO G. WATSON FRENCH, NATHANIEL FRENCH, AND JOSEPH L. HECHT, ALL OF DAVENPORT, IOWA, COMPOSING THE FIRM OF FRENCH & HECHT, OF DAVENPORT, IOWA.

METAL-WHEEL CONSTRUCTION.

1,199,179. Specification of Letters Patent. Patented Sept. 26, 1916.

Application filed October 29, 1914. Serial No. 869,221.

*To all whom it may concern:*

Be it known that I, JOSEPH L. HECHT, a citizen of the United States, residing at Davenport, in the county of Scott and State of Iowa, have invented certain new and useful Improvements in Metal-Wheel Construction, of which the following is a specification, reference being had therein to the accompanying drawing.

This invention relates to means for connecting parts or members fixedly together, and has reference more particularly to the connection of the parts of metal wheels, that is, the connection of the spokes, either to the hub or tire or both.

The aim of the invention is to so connect the spokes that the parts of the wheel will be joined with great strength and rigidity, and without danger of disconnection, displacement or looseness, and with this end in view the invention consists in providing the spoke with an overhanging annular portion or flange, and in providing the adjacent member of the wheel, either the hub or tire or both, with a projecting hollow boss, which latter surrounds the spoke and has its end seated within the overhanging flange, the spoke being provided also with an enlargement seated in the boss. As a result of this construction, the end of the boss will be embraced and reinforced by the flange, and prevented from spreading in the event of the spoke being subjected to endwise tension or pressure tending to force the enlarged portion through the boss.

Figure 3:
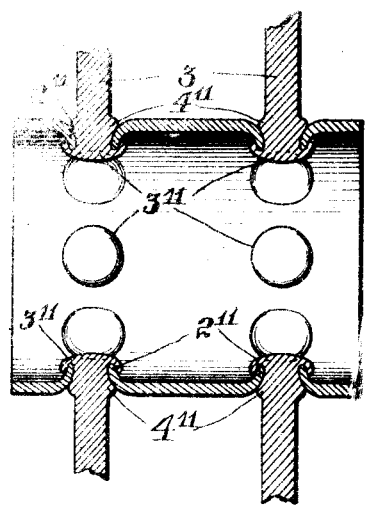
Figure 4:
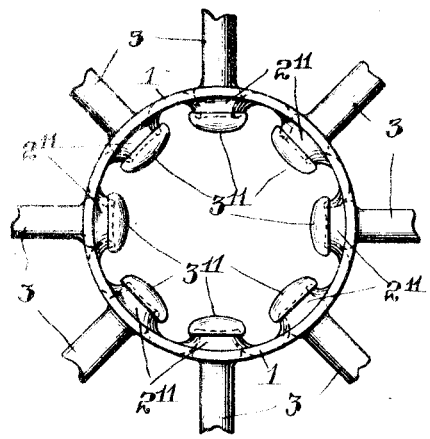
Figure 5:
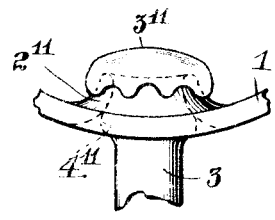

In the accompanying drawings: Figure 1 is a longitudinal section through a wheel having my invention embodied therein in its preferred form. Fig. 2 is an end elevation of the hub of the wheel and the connected ends of the spokes. Fig. 3 is a longitudinal section of a hub and connected spokes, showing the invention in modified form. Fig. 4 is an end elevation of the same. Fig. 5 is a sectional elevation showing a modified form of a detail.

Referring to the drawings, referring to Figs. 1 and 2, 1 represents a metal wheel hub, preferably in the form of a section of steel tubing, which is provided at intervals therearound with a series of hollow hub bosses 2 projecting radially outward therefrom. These bosses may be formed in any appropriate manner or by any appropriate means, but I prefer to form them by punching or throwing the metal outwardly so as to produce tubular projections formed integrally with the hub body. Secured within the bosses are spokes 3, each provided near its inner end with an annular flange 4 overhanging the body of the spoke and thereby forming an annular groove 5 extending axially of the spoke. The inner end of the spoke is seated within the tubular boss, with the outer end of the latter extending within the annular groove in the flange and embraced by the latter, the end of the spoke being provided with an enlargement or swell 6, of a diameter greater than that of the opening at the outer end of the boss, and seated in the boss. As a result of this construction the spoke will be held rigidly and firmly at its end within the boss, and the latter will be reinforced by the overhanging embracing flange, and by reason of the enlarged portion of the spoke seated within the boss, the displacement of the spoke in a radial direction outwardly will be prevented, as the tendency of such displacement to expand the boss will be resisted and prevented by the surrounding flange on the spoke embracing the end of the boss. The boss is therefore effectually reinforced by the overhanging flange, and the spoke is fixedly and rigidly held within the boss from movement in both directions radially. The outer ends of the spokes may be connected with the tire 7 in any suitable manner, but in the drawings I have shown the same method of attachment as that just described, the tire being provided with an inwardly extending hollow boss 2', and the spoke with an overhanging flange 3' embracing the end of the boss, and provided also with an enlargement or shoulder 4' seated within the boss.

Fig. 3 shows a modified form of the invention, which is embodied in the connection of the spokes with the hub. In this case the hollow boss 2'' extends inwardly from the body of the hub, and the inner extremity of the spoke is provided with an overhanging flange 3'' embracing the end of the boss, the enlargement or shoulder 4'' on the spoke being formed inward of its inner end and seated within the boss. The action and function of the parts however are the same as in the case of the corresponding parts first described, in that the overhanging flange on the spoke serves to reinforce the boss, and prevents its spread in the event of the spoke being subjected to endwise pressure or strain.

While I have described the overhanging portion of the spoke as an annular flange, which in Figs. 1, 2 and 3 is shown as having its edge continuous, this continuous edge is not absolutely necessary, because the overhanging embracing portion could be constructed in the form of fingers or teeth as shown in Fig. 5, producing in effect an annular groove in the spoke extending axially of the same.

The invention is applicable either to the attachment of the spokes to the hub member of the wheel, or to the tire member, or both, and is applicable also generally to the connection of parts of other constructions, and wherever a firm and rigid union between the parts is desired.

I have in the accompanying drawings and foregoing description disclosed my invention in the particular detailed form which I prefer to adopt, but it will be understood that these details may be variously changed and modified without departing from the scope of the invention; and further it will be understood that the invention is not limited to any particular form or construction of the parts except in so far as such limitations are specified in the claims.

Having thus described my invention, what I claim is:

1. In combination with a member provided with a projecting hollow boss, a second member extending within said boss and provided with an overhanging annular flange embracing the end of the boss and restraining the same against lateral spread, said second member being also provided with an annular enlargement seated within the boss.

2. In a wheel, the combination of a spoke provided with an annular flange forming an annular groove surrounding the spoke, an adjacent member of the wheel formed with a hollow boss surrounding the spoke and having its end seated and confined in the groove and restrained by the flange against lateral spread, the portion of said spoke within the boss being greater in cross-sectional extent than the internal diameter of the confined end of the boss.

3. In a wheel, the combination of a spoke provided with an annular flange extending axially thereof and forming an axially extending annular groove surrounding the spoke, and an adjacent member of the wheel provided with a projecting hollow boss surrounding the spoke and extending axially of the same and having its end seated and confined in the groove in the spoke.

4. In a wheel, the combination of a spoke provided with an annular flange extending axially thereof and forming an axially extending annular groove surrounding the spoke, and an adjacent member of the wheel provided with a hollow projecting boss extending axially of and surrounding the spoke, said boss having its end seated in the groove in the spoke, and said spoke being provided also with a shoulder seated within the boss.

5. In a wheel, the combination of a hub provided with a projecting hollow spoke boss, and a spoke seated therein and having an annular axially extending flange forming an axially extending groove in which the end of the boss is seated and confined against lateral spread.

6. In a wheel, the combination of a hub provided with a projecting hollow spoke boss, and a spoke seated therein and having an annular axially extending flange forming an axially extending groove in which the end of the boss is seated and confined against lateral spread, said spoke being provided also with an enlargement seated in the boss.

7. In a wheel, the combination of a hub having an outwardly projecting hollow spoke boss, and a spoke extending within said boss and having outward of its end an annular axially extending flange forming an axially extending annular groove in which the end of the boss is seated and restrained against lateral spread.

8. In a wheel, the combination of a hub having an outwardly projecting hollow spoke boss, and a spoke extending within said boss and having outward of its end an annular axially extending flange forming an axially extending annular groove in which the end of the boss is seated and restrained against lateral spread, the inner end of the spoke within the boss being enlarged.

9. In a wheel, the combination of a tire having a projecting hollow spoke boss, and a spoke extending therein and provided with an annular axially extending flange forming an axially extending groove surrounding the spoke, the end of the boss being seated in the groove and restrained by the flange against lateral spread.

10. In a wheel, the combination of a tire having a projecting hollow spoke boss, and a spoke extending therein and provided with an annular axially extending flange forming an axially extending groove surrounding the spoke, the end of the boss being seated in the groove and restrained against lateral spread, and the said spoke being provided also with an annular enlargement seated in the boss.

In testimony whereof, I have affixed my signature in presence of two witnesses.

JOSEPH L. HECHT.

Witnesses:
ANDREW NEILSON,
SAM L. SAMPLE.